United States Patent
Freeman et al.

(10) Patent No.: US 11,728,049 B2
(45) Date of Patent: Aug. 15, 2023

(54) REACTOR CORE AND CONTROL ELEMENTS SUPPORTED BY A REACTOR VESSEL HEAD

(71) Applicant: TerraPower, LLC, Bellevue, WA (US)

(72) Inventors: Charles Gregory Freeman, Tampa, FL (US); Calen Kaneko, Seattle, WA (US); Christopher A Martin, Seattle, WA (US); Sean T Mosier, Wilmington, NC (US)

(73) Assignee: TERRAPOWER, LLC, Bellevue, WA (US)

( * ) Notice: Subject to any disclaimer, the term of this patent is extended or adjusted under 35 U.S.C. 154(b) by 138 days.

(21) Appl. No.: 17/164,820

(22) Filed: Feb. 1, 2021

(65) Prior Publication Data
US 2022/0051814 A1    Feb. 17, 2022

Related U.S. Application Data

(60) Provisional application No. 63/066,785, filed on Aug. 17, 2020.

(51) Int. Cl.
| | | |
|---|---|---|
| *G21C 5/10* | (2006.01) | |
| *G21C 13/04* | (2006.01) | |
| *G21C 13/024* | (2006.01) | |
| *G21C 15/18* | (2006.01) | |
| *G21C 9/00* | (2006.01) | |

(Continued)

(52) U.S. Cl.
CPC .............. *G21C 5/10* (2013.01); *G21C 13/024* (2013.01); *G21C 13/04* (2013.01); *G21C 1/028* (2013.01); *G21C 1/326* (2013.01); *G21C 3/33* (2013.01); *G21C 9/00* (2013.01); *G21C 15/12* (2013.01); *G21C 15/185* (2019.01);

(Continued)

(58) Field of Classification Search
CPC ......... G21C 5/10; G21C 13/04; G21C 13/024
USPC .......................................... 376/302, 461, 909
See application file for complete search history.

(56) References Cited

U.S. PATENT DOCUMENTS 3,995,918 A * 12/1976 Mahé ................... G21C 13/024
                                                         376/461
4,050,986 A *  9/1977 Ference ................. G21C 13/02
                                                         376/302

(Continued)

FOREIGN PATENT DOCUMENTS

EP           0118016 A1     9/1984

OTHER PUBLICATIONS

PCT/US2021/022017 International Search Report and Written Opinion dated Aug. 3, 2021, 12 pages.

*Primary Examiner* — Jack W Keith
*Assistant Examiner* — Daniel Wasil
(74) *Attorney, Agent, or Firm* — FisherBroyles, LLP; Jeremy P. Sanders (57) ABSTRACT

A nuclear reactor is designed to couple the load path of the control elements with the reactor core, thus reducing the opportunity for differential movement between the control elements and the reactor core. A cartridge core barrel can be fabricated in a manufacturing facility to include the reactor core, control element supports, and control element drive system. The cartridge core barrel can be mounted to a reactor vessel head, and any movement, such as through seismic forces, transmits an equal direction and magnitude to the (Continued)

control elements and the reactor core, thus inhibiting the opportunity for differential movement.

4 Claims, 12 Drawing Sheets

(51) Int. Cl.
- *G21C 3/33* (2006.01)
- *G21C 1/02* (2006.01)
- *G21C 15/247* (2006.01)
- *G21C 19/04* (2006.01)
- *H02K 44/06* (2006.01)
- *G21C 1/32* (2006.01)
- *G21C 15/12* (2006.01)

(52) U.S. Cl.
CPC ........... *G21C 15/247* (2013.01); *G21C 19/04* (2013.01); *H02K 44/06* (2013.01)

(56) References Cited

U.S. PATENT DOCUMENTS

| | | | |
|---|---|---|---|
| 4,096,034 A | 6/1978 | Anthony | |
| 4,198,271 A * | 4/1980 | Seed | G21C 5/10 376/461 |
| 4,219,385 A * | 8/1980 | Guidez | F04D 29/606 376/461 |
| 4,508,677 A * | 4/1985 | Craig | G21C 1/322 376/909 |
| 4,645,638 A | 2/1987 | Burelbach et al. | |
| 2019/0189296 A1* | 6/2019 | Cinotti | G21C 5/10 |

\* cited by examiner

REACTOR CORE AND CONTROL ELEMENTS SUPPORTED BY A REACTOR VESSEL HEAD

CROSS-REFERENCE TO RELATED APPLICATIONS

This application claims the benefit of U.S. Provisional Patent Application No. 63/066,785, filed Aug. 17, 2020, entitled "CARTRIDGE CORE BARREL FOR NUCLEAR REACTOR," the contents of which is incorporated herein by reference in its entirety.

BACKGROUND

Most nuclear reactors have a core within which fuel elements and control elements are supported in different interrelated arrangements to support a critical reactivity to control the output of the reactor. Coolant is typically forced through passages between fuel elements and control elements to transfer heat generated by fissioning fuel elements to a heat exchanger to be used for useful purposes.

In some cases, molten metal is used as the coolant, which in some cases, is sodium. In some nuclear reactors, such as in a pool type reactor in which the core is submerged in a pool of coolant held within a reactor vessel, the core is often supported by the reactor vessel while the control elements are often supported from a deck of the vessel head that encloses the top of the reactor vessel.

This control element support arrangement is often preferable from a safety standpoint. For example, if the control element support structures were to fail, the control elements would fall into the reactor vessel and reduce reactivity within the core. Typically, the weight of the core is supported by the reactor vessel, as is the in-vessel handling system for the fuel elements and reactivity elements along with the fuel elements and reactivity elements.

In addition to the weight of the core, the vessel also supports the weight of the coolant contained therein. The vessel must therefore be robust in order to support the applied loads not only in static conditions, but must also be able to support the loads during seismic events, which can apply dramatically greater loads than in a static condition.

Moreover, any relative motion between the reactor core and the control elements can impact the reactivity within the core, and thus, reactors are designed to minimize relative motion between the core and control elements. If a reactor vessel is supported from the side or its bottom and the coolant inventory is brought into motion, such as by a seismic event, the flexibility of the reactor vessel can allow the reactor core to move relative to the control elements suspended from the vessel head, thus causing swings in a reactivity coefficient (Keff) in both positive and negative reactivity directions.

SUMMARY

According to some embodiments, a reactor layout is described in which the reactor vessel hangs from the reactor head; however, the weight of the core may not be supported by the reactor head, but rather, can be transmitted directly to supporting structures located outside the reactor vessel and supported by the earth. In some examples, the reactor core is supported by a cartridge that is suspended from the reactor vessel head, thus coupling the load path of both the reactor core and the control elements to a common support structure, which reduces the potential of relative movement between the reactor core and the control elements.

According to some embodiments, a nuclear reactor core support system includes a support cylinder, the support cylinder having an upper portion and a lower portion; and a mount at the upper portion, the mount configured to engage with a reactor vessel head and support the weight of the support cylinder from the reactor vessel head wherein the support cylinder hangs from the reactor vessel head.

In some cases, a reactor core is within the support cylinder. The support cylinder and the reactor core may be preassembled and shipped to a reactor installation site.

In some instances, a fuel element handling system is positioned within the support cylinder. Further, a control element support system may be within the support cylinder.

In some embodiments, the support cylinder and a control element drive system share a common load path. In other words, the weight of the support cylinder and the control element drive system is supported by the same structure.

For example, the support cylinder and the control element drive system may both be suspended from a portion of the reactor vessel head.

In some cases, support for a reactor core located within the support cylinder does not transmit a load to the reactor vessel. For example, the reactor core may be located within the support cylinder and the weight of the reactor core may be supported by the reactor vessel head.

According to some embodiments, a method for constructing a nuclear reactor includes the steps of fabricating, in a manufacturing facility, a reactor vessel; fabricating, in the manufacturing facility, a cartridge core barrel; fabricating, in the manufacturing facility, a reactor core; fabricating, in the manufacturing facility, a control element drive system; assembling, in the manufacturing facility, the control element drive system and the reactor core within the cartridge core barrel to create a core module; and shipping the core module to a construction site.

The method may further include shipping the reactor vessel to the construction site. In some cases, the method may include installing the reactor vessel in a reactor building. The method may further include the step of placing the reactor module inside the reactor vessel.

The method of constructing a nuclear reactor may include, in some cases, coupling the reactor core module to a first portion of a reactor vessel head. In some cases, the method includes coupling the control element drive system to the first portion of the reactor vessel head.

According to some embodiments, a below core support structure for a nuclear reactor core includes a conical support portion; a cylindrical support portion coupled to the conical support portion by a transition portion; and one or more vertical ribs.

The one or more vertical ribs may be coupled to the conical support portion. The conical support portion may include a conical tension skirt having a large diameter periphery coupled to the cylindrical support portion. In some cases, the one or more vertical ribs are coupled to an upper surface of the conical tension skirt.

DETAILED DESCRIPTION

This disclosure generally relates to apparatuses for a below-core support, such as support for a nuclear reactor vessel, or a nuclear reactor core, which in some cases, is a conical support that transitions to the cylindrical support of the reactor vessel. In some cases, vertical ribs within the conical support section provide additional stiffness, rigidity, and support.

In some cases, a core is supported from below, such as by ribs, a skirt, or a platform. In some embodiments, a core is supported by a rim, and may have structure that engages an upper rim of the core and the core hangs by its rim from the support. In some cases, a vertical cylinder includes a core support structure and core baffles. The core may be inserted from the top of the reactor and supported by the reactor head. In some embodiments, the disclosed arrangements and support structures facilitate shipping of prefabricated and assembled, or partially assembled, components and final assembly of the components at a nuclear reactor installation site.

According to some embodiments, a structural cylinder supports a load and transmits the load to the reactor head. According to some embodiments, a control package and core control package may be fabricated and then lowered into place within the structural cylinder. The structural cylinder may support the load of the control package and core control package.

The support cylinder may be manufactured in a manufacturing facility and may include the core barrel and core components already installed before the support cylinder is shipped to a reactor installation site. The support cylinder may additionally have a rotating plug, ports, and other components pre-installed prior to shipping to facilitate later assembly, thus improving accuracy, tolerances, and manufacturing and assembly time.

While the following description is useful in the design and construction of a sodium-cooled fast reactor (SFR), many of the concepts disclosed herein may be equally applicable to other reactor types, and the disclosure should not be limited to SFR technology unless specifically stated.

Figure 1:
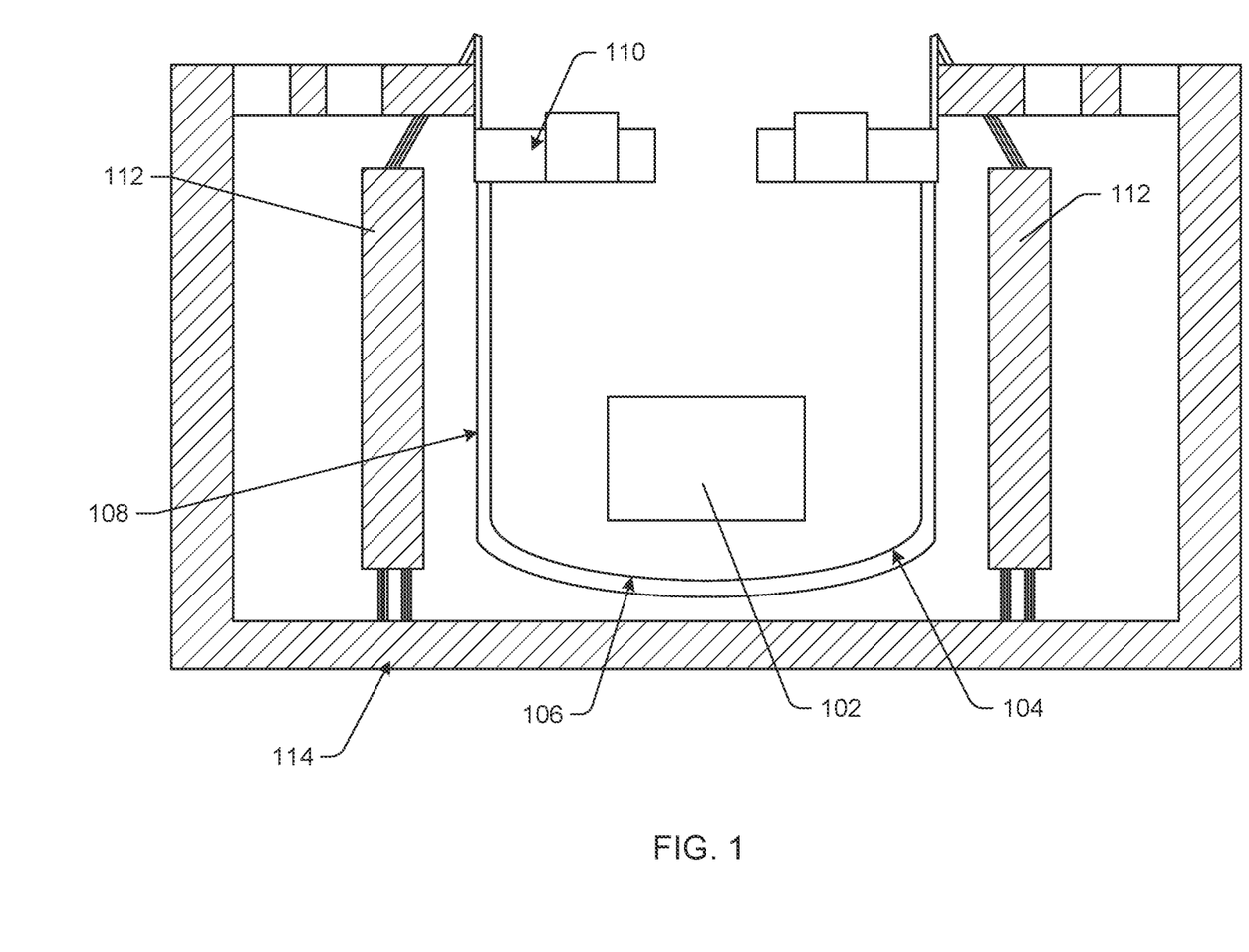
FIG. 1 is a schematic representation of a nuclear reactor support structure, in accordance with some embodiments.

FIG. 1 illustrates a core support structure (CSS) for a nuclear reactor core. A nuclear reactor includes a core 102 situated within a reactor vessel 104. The reactor vessel 104 is typically closed at its lower end by a bottom head 106 coupled to a cylindrical portion 108. A vessel head 110 is mated to the top of the cylindrical portion 108 and closes the reactor vessel 104 and further provides support for reactor internals, such as a rotating plug, core support structures, flow directing members, a control element handling system, a fuel element handling system, and other internal vessel equipment.

In many reactors, the reactor vessel 104 is suspended from the reactor head 110. The reactor head 110, in turn, is supported by structure that forms part of the building in which the reactor is housed. For example, support structures 112, which may be concrete, are coupled to the foundation 114. The support structures 112 are additionally supportive of the reactor head 110 so that the weight of the reactor head is supported in compression by the support structures 112. The reactor vessel 104 typically hangs from the reactor head 110, so its weight is also borne by the support structures 112, which transmit the load to the foundation 114.

The reactor vessel 104 contains reactor internals which in some cases include the lower core support structure (not shown), the upper core support structure, and the in-core instrumentation support structure. The internals are configured to support, align, and guide the core components; direct coolant flow to and from the core components; and guide and support the in-core instrumentation. The lower core support structure is typically coupled to the reactor core 102 and transmits the weight of the core 102 to the bottom head 106 of the reactor vessel 104. The lower core support structure may be columns, piers, or other supports below the core that allow the core 102 to be supported by the bottom head 106 of the reactor vessel 104.

A core barrel supports and contains the fuel components and directs the coolant flow. In some cases, the core barrel hangs on an upper ledge of the reactor vessel. In some cases, the core barrel is allowed to thermally expand in a radial direction and axial direction, but transverse movement of the core barrel is restricted to inhibit misalignment with the fuel elements and control elements. The core barrel may be coupled to the reactor vessel through any suitable structure that allows the weight of the core barrel to be borne by the reactor vessel from which the core barrel hangs.

Figure 2:
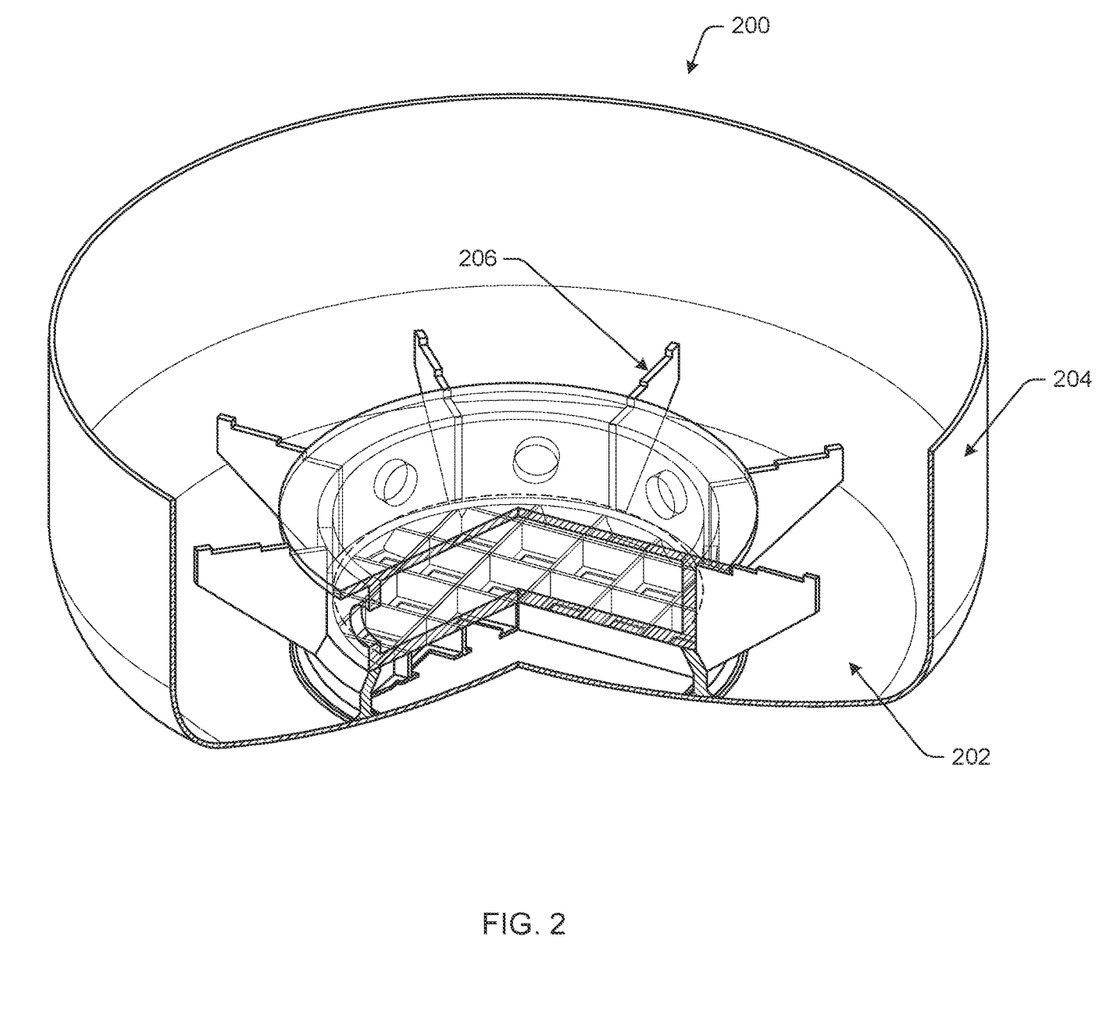
FIG. 2 illustrates a below core support structure for a core-vessel interface; in accordance with some embodiments.

With reference to FIG. 2, a below core support 200 includes a conical support 202 that transitions to the cylinder 204 that interfaces with the bottom reactor vessel head. One or more vertical ribs 206 aid in locating and supporting the ex-core barrel shielding and the flow guide. Further, the vertical ribs 206 help to combine the core support structure and the core-vessel interface structure into a single structure, that may be shippable as a unit. This facilitates fabricating the below core support structure in a factory and shipping the core support structure to a construction site for assembly.

Figure 3:
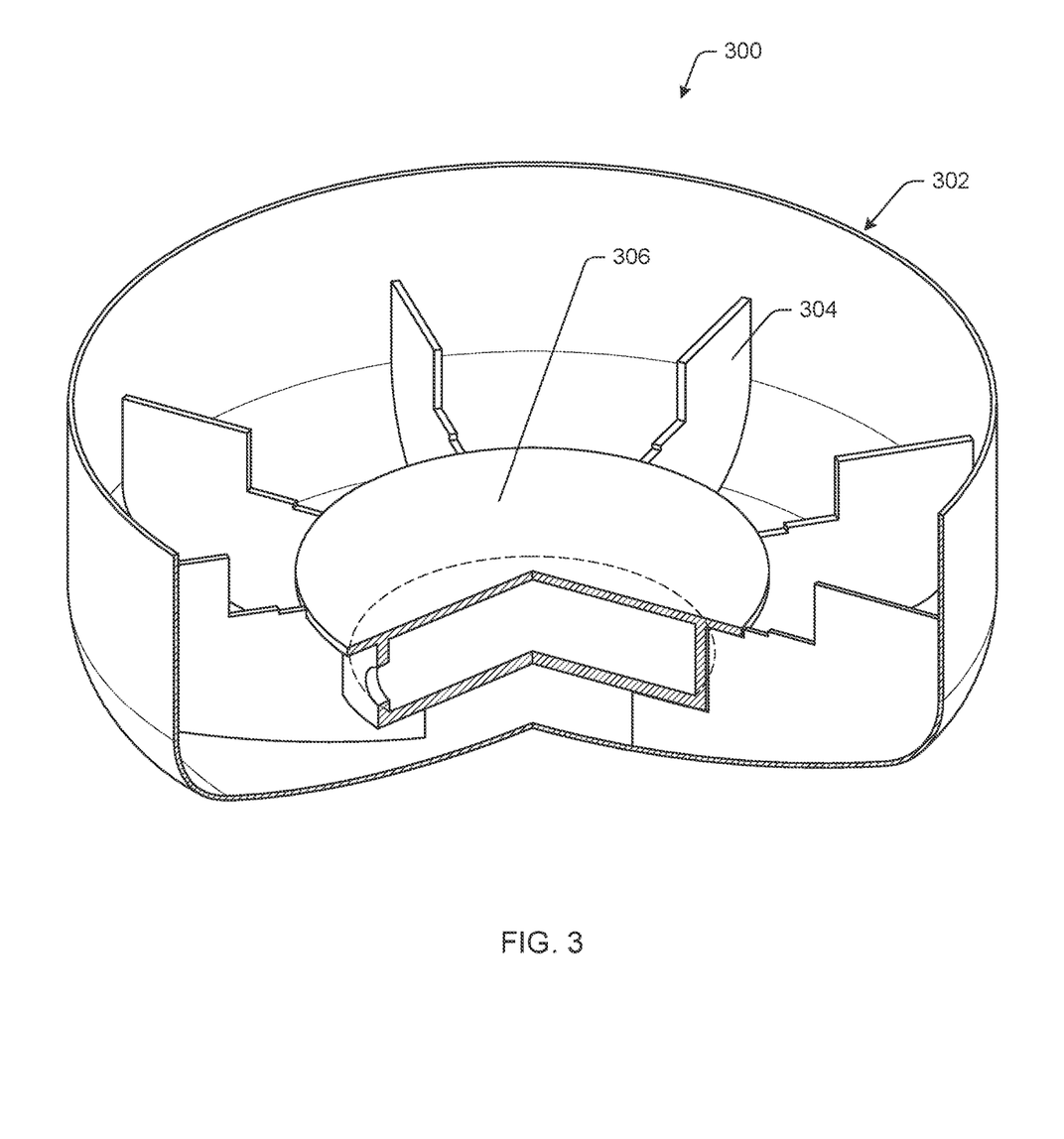
FIG. 3 illustrates a below core support structure for a core-vessel interface, in accordance with some embodiments.

FIG. 3 shows another example of a below core support structure 300 that is integral with the reactor vessel bottom head 302. The core support structure 300 includes a plurality of ribs 304 to increase stiffness and lateral stability of the core support structure 300. A grid plate 306 is supported by the ribs 304 and provides support for the core which rests thereon. The reactor vessel bottom head 302 is suspended from the cylindrical portion of the reactor vessel.

The integration of the below core support structure 300 into the reactor vessel bottom head provides several advantages. For instance, it reduces the number of components and assemblies, it is compatible with a reactor vessel auxiliary cooling system (RVACS) and provides a level of lateral stability to support the core.

Figure 4:
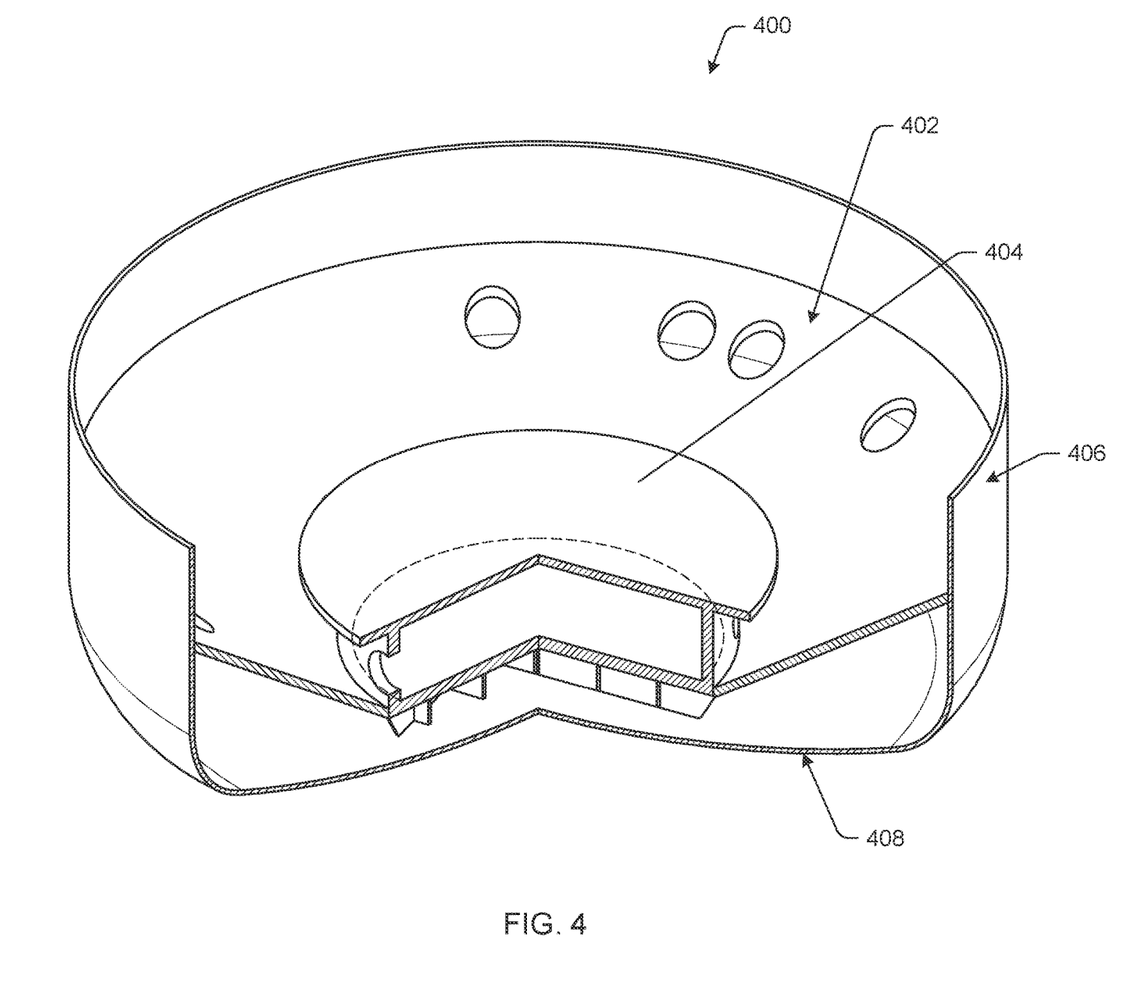
FIG. 4 illustrates a below core support structure with a hanging tension skirt for a core-vessel interface; in accordance with some embodiments.

FIG. 4 illustrates another example of a below core support structure 400 in which a conical tension skirt 402 supports a grid plate structure 404. The core is supported on the grid plate structure 404 and the load of the core is transmitted through the conical tension skirt 402 directly to the cylindrical portion 406 of the reactor vessel. In some cases, this arrangement avoids the load of the core from being applied to the reactor vessel bottom head 408, but rather, transmits the core load directly to the cylindrical portion 406 of the reactor vessel.

The result is a relatively simple fabrication and the conical tension skirt 402 ameliorates the necessity of internal support from the bottom reactor vessel head 408, routing the core and internals loads through the reactor vessel cylindrical portion 406 in tension.

Figure 5:
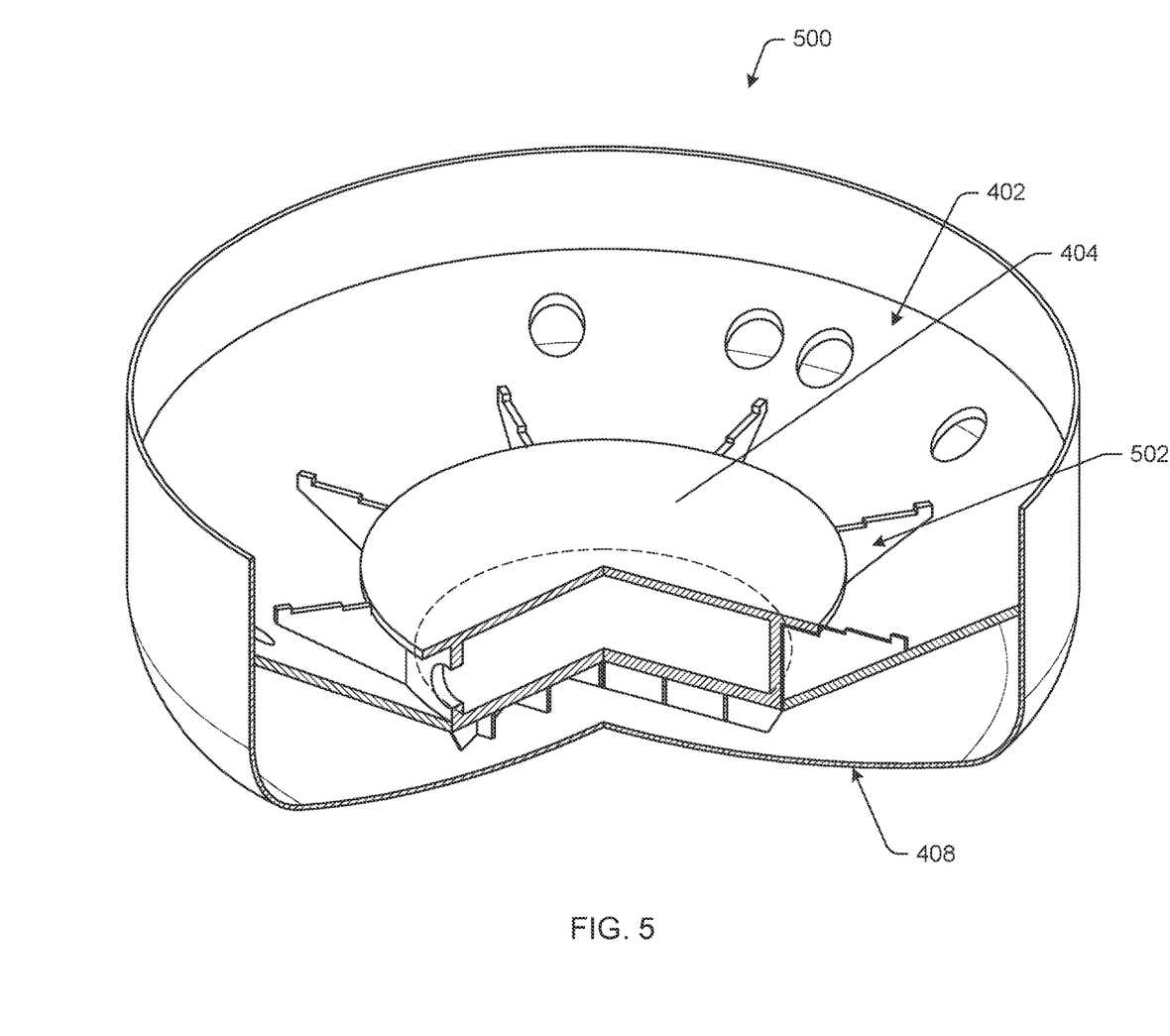
FIG. 5 illustrates a below core support structure with ribs, in accordance with some embodiments.

FIG. 5 illustrates an alternate structure for a below core support structure 500 that is similar to the structure shown in FIG. 4 with the addition of ribs 502 above the conical tension skirt 402. The ribs 502 support the flow guide and provide coolant channels as well as provide additional stiffness.

Figure 6:
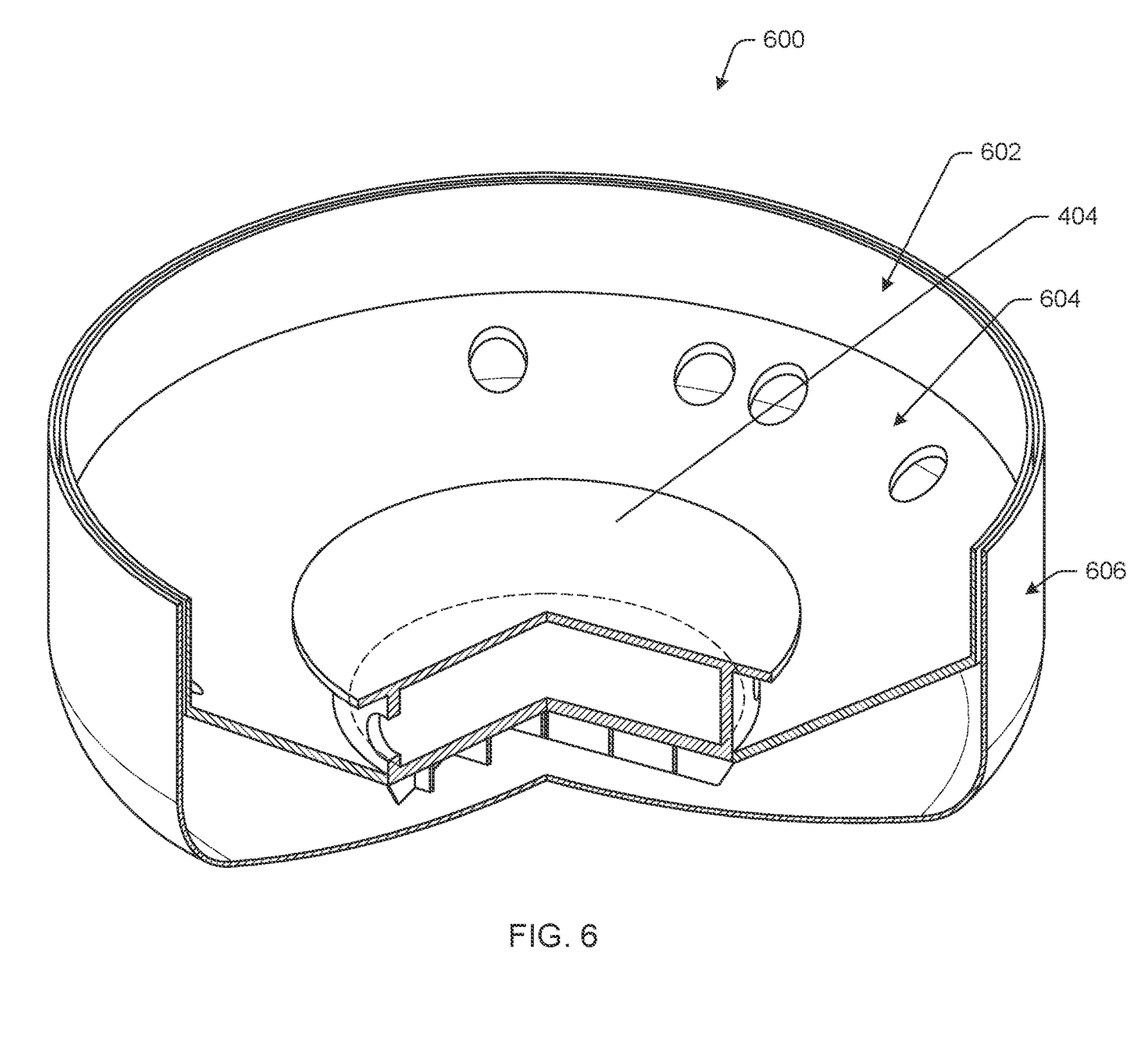
FIG. 6 illustrates a below core support structure independent of the reactor vessel, in accordance with some embodiments.

FIG. 6 illustrates an alternative structure for a below core support 600. The below core support 600 includes a cylindrical portion 602, and a conical tension skirt 604 depending from the cylindrical portion 602.

The below core support 600, in some instances, is independent from the reactor vessel 606 which may reduce stresses on the reactor vessel 606. In some cases, the below core support 600 may be attached to the reactor vessel 606 by welding to provide intimate surface contact to distribute stresses, improve stiffness, and distribute the core load to the cylindrical portion of the reactor vessel 606. In some embodiments, the reactor core can be coupled to the below core support 600, such as in a manufacturing facility (e.g., factory), and the entire core with below core support 600 can be lowered into the reactor vessel and assembled to the reactor vessel at the construction site. Like with many of the disclosed examples, the components can be fabricated in a manufacturing facility, partially assembled, shipped to the construction site and final assembly can be performed at the construction site efficiently, economically, and with a higher degree of precision than traditional on-site fabrication techniques provide.

Figure 7:
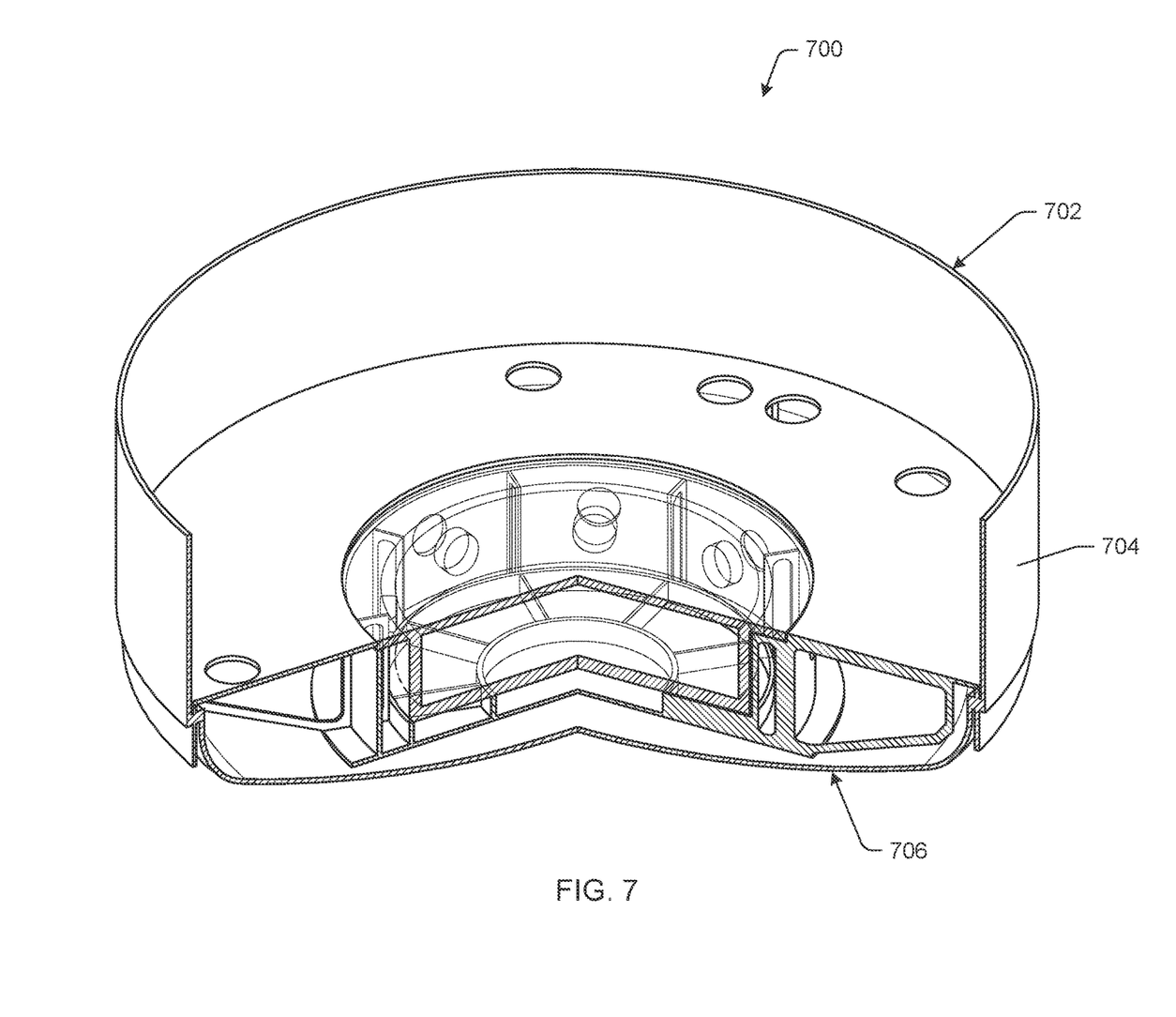
FIG. 7 illustrates a below core support structure in a bottom-supported vessel configuration, in accordance with some embodiments.

FIG. 7 illustrates an alternative below core support 700 in which the load path of the reactor core is transmitted to a bottom support. The reactor vessel 702 has a cylindrical portion 704 coupled to a bottom vessel head 706. In some cases, the bottom vessel head 706 rests on one or more supports to transmit the weight of the reactor vessel 702 downwardly eventually to the foundation of the reactor building. In some cases, the below core support 700 is coupled to the reactor vessel 702 and the core load is likewise transmitted downwardly to supports and ultimately to the foundation of the reactor building. In the examples in which the core load is transmitted downwardly to supports below the reactor vessel 702, the core load may not be supported by the reactor vessel 702, and thus the flexibility of the of the reactor vessel 702 has a reduced effect on the alignment of the control elements with the reactor core.

Further, the lateral support for the core includes a significant below core structure that is tied to the same support from which the reactor vessel 702 is supported. Not only does this significantly reduce the load path for the core load, but also supports the core substantially along its center of gravity and provides a robust core support.

Figure 8:
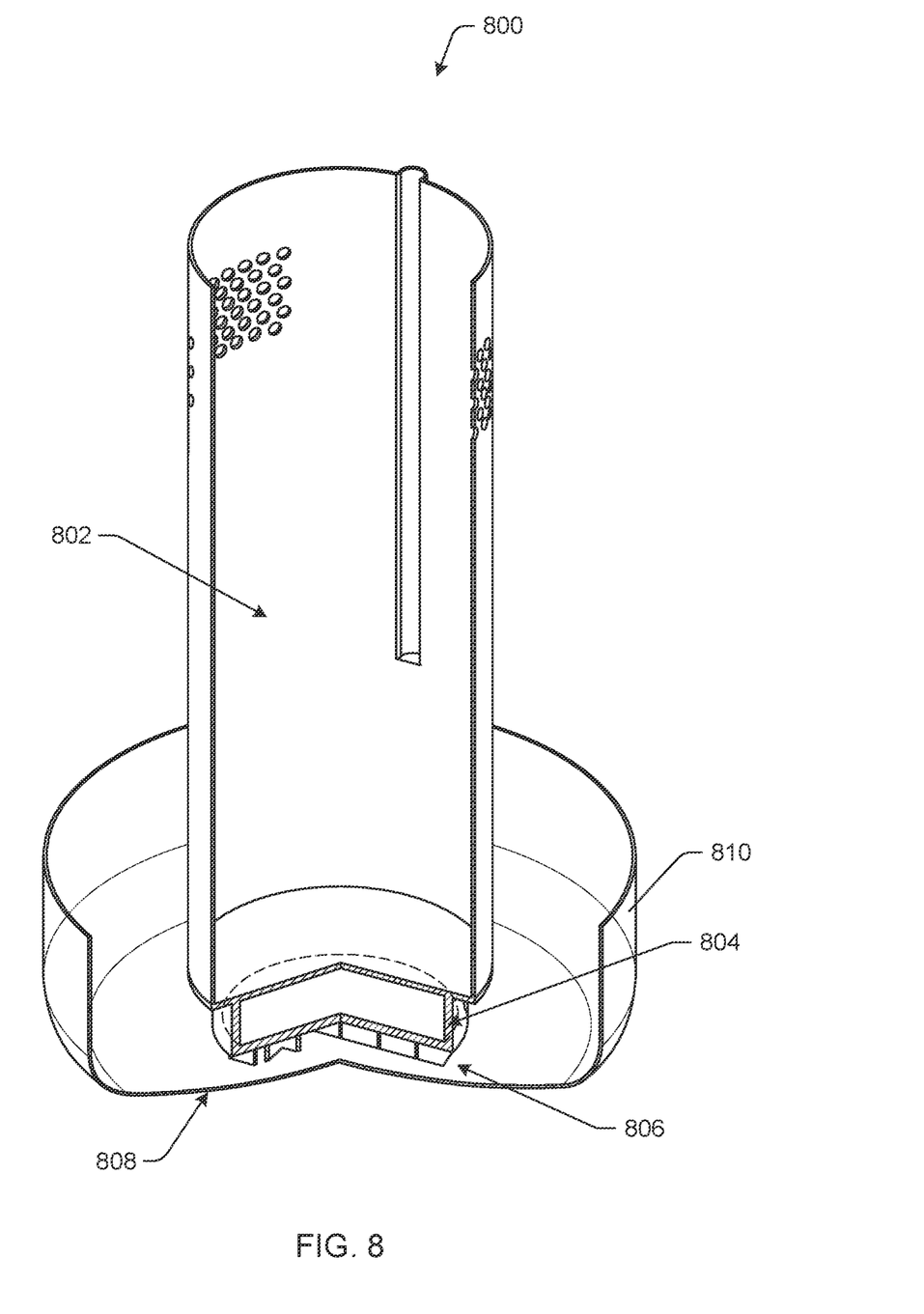
FIG. 8 illustrates a core support structure configured to hang from the reactor head, in accordance with some embodiments.
Figure 9:
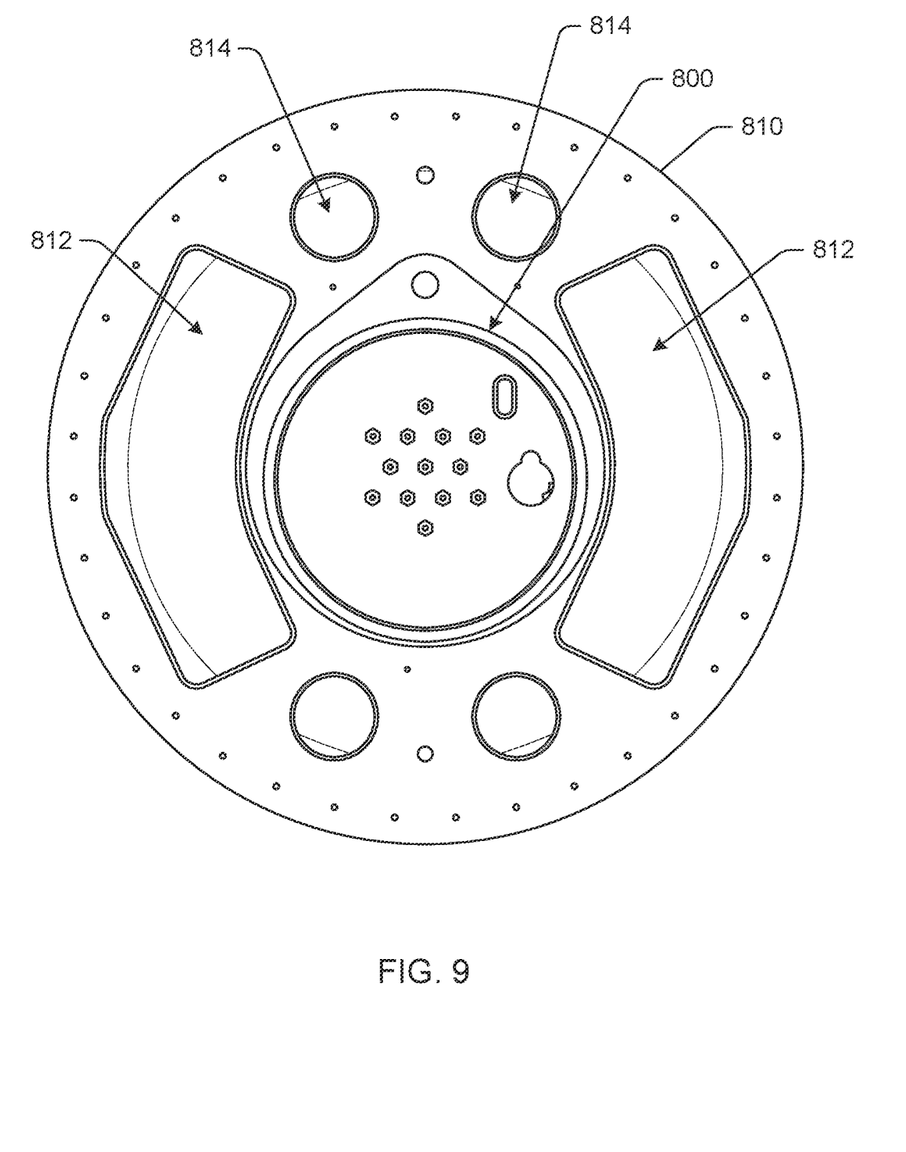
FIG. 9 illustrates a core support structure utilizing a cartridge to couple the core support to the control rod support, in accordance with some embodiments.

With reference to FIGS. 8 and 9, a cartridge 800 configuration is illustrated in which the core load is supported vertically through the core barrel. The cartridge 800 is a generally cylindrical chamber 802 that allows the nuclear core to be inserted from the top. The cartridge 800 includes a cooperating bottom support structure 804 that interfaces with the below core support 806 carried by the reactor vessel bottom head 808. The cooperating below core support structure 804 facilitates lowering the cartridge 800 into the reactor vessel 810 and locating the cartridge 800 with respect to the vessel bottom head 808.

In some cases, the core load is supported by the cartridge 800 to a discrete portion of the reactor head, which in some cases, also supports and contains the rotating plug assembly. Utilizing a cartridge 800 as shown and described simplifies factory fabrication and on-site assembly, as the cartridge 800 can be fabricated in a manufacturing facility and assembled with the core and internals pre-installed prior to shipment.

In some cases, the cartridge 800 is supported from above by the reactor head, which provides the further advantage of coupling the reactor core to the same load path as the control element support, and thus any differential movement of the reactor core and control elements, such as by seismic events, is further reduced.

In the illustrated example, the core support is directly coupled to the control element support, which further reduces the importance of the reactor vessel in providing support to the reactor core, thereby reducing the required precision in fabrication and assembly of the reactor core to the reactor vessel 810.

The reactor vessel 810 may include additional structures required for operation, such as one or more heat exchangers 812 and one or more pumps 814 for circulating coolant through the reactor vessel and the reactor core.

According to some embodiments, the load chain including the core, the cartridge, and reactor vessel head may be fabricated in a manufacturing facility and shipped to the construction site as a module for final assembly. This not only decreases the required on-site fabrication work, but increases efficiency as the reactor vessel, vessel head, and internals can be lifted and placed in the reactor building. In some cases, the core and cartridge may be manufactured as a module and shipped to a construction site for final assembly with the reactor vessel head being a separate module.

In addition, the illustrated cartridge configuration 800 further decouples the nuclear heat and control module from the heat transport functions so that a standard central cartridge 800 and reactor core module may be inserted into different nuclear reactor arrangements with minimal changes. In other words, an entire cartridge 800 that includes the reactor core, control elements, and core internals can be removed from a nuclear reactor and a different cartridge 800 can be installed in its place.

Figure 10:
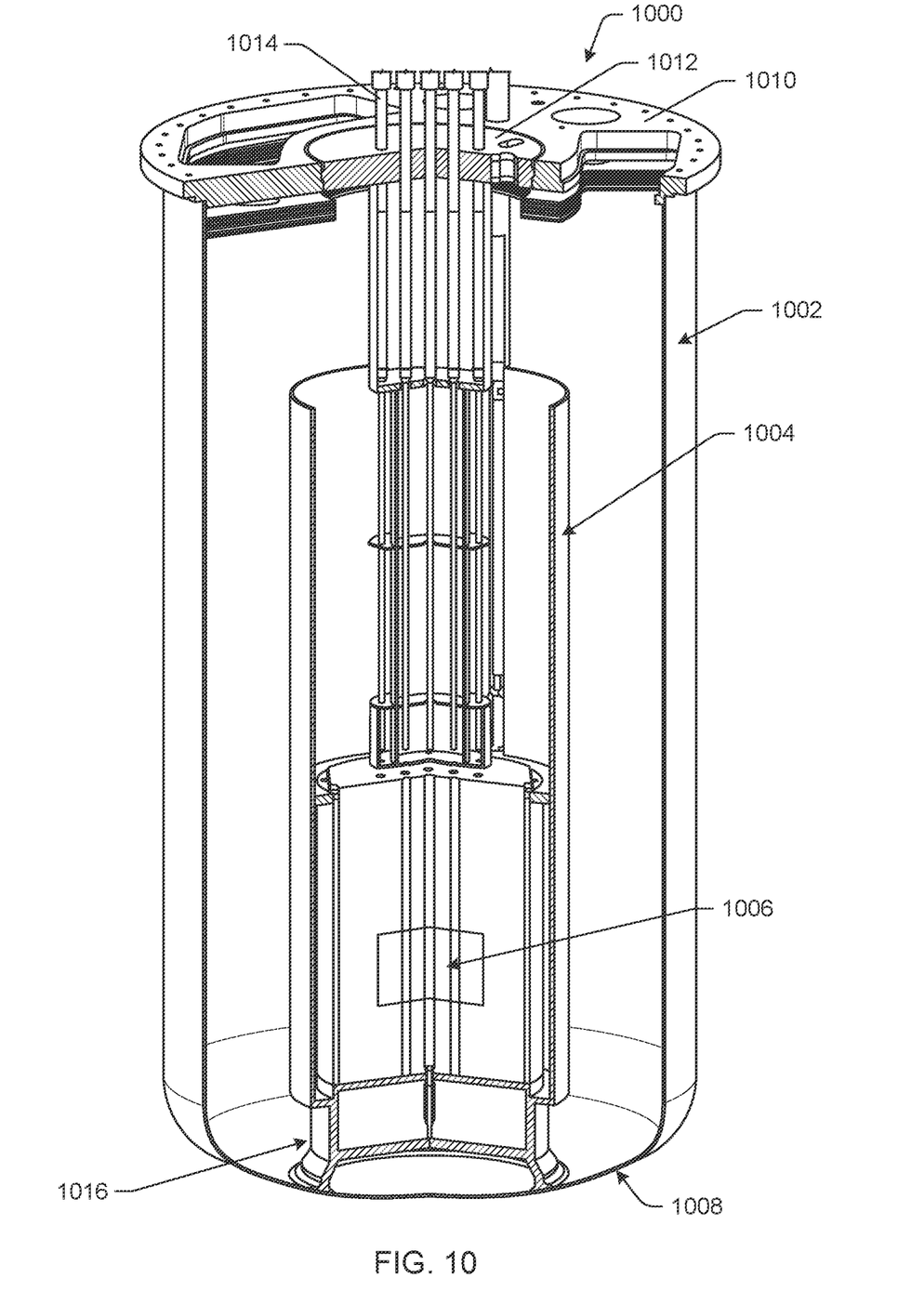
FIG. 10 illustrates a below core support structure and load path through the reactor vessel, in accordance with some embodiments.

FIG. 10 illustrates a schematic diagram of a nuclear reactor 1000 including a reactor vessel 1002, a core barrel 1004, and a reactor core 1006. The reactor vessel 1002 further includes a vessel bottom head 1008 and a vessel head 1010. The vessel head 1010 includes a control element support structure 1012 that supports the control elements 1014, which may be used to control reactivity within the nuclear core 1006.

In the illustrated embodiment, the weight of the reactor core is carried by the core barrel 1004, which in turn is supported by a below core support 1016 that transmits the core load to the reactor vessel bottom head 1008. In some cases, the reactor vessel 1002 is supported by a mount, such as a flange, formed in the vessel head 1010 and the reactor vessel 1002 hangs from the vessel head 1010. Thus, the weight of the reactor vessel, along with the reactor core and core barrel, is supported by the vessel head 1010. In some instances, there may be further support structures, such as beneath the reactor vessel 1002, or adjacent to the reactor barrel 1004 to support against lateral loads.

One area of sensitivity in the construction of a nuclear reactor is the response of the reactor internals to a seismic event. For example, a seismic event may cause the reactor vessel 1002 to move both laterally and axially in response to seismic forces. Similarly, the control elements 1014 may also move in response to seismic forces. Where there is differential movement between the control elements 1014 and the reactor vessel 1002, reactivity within the reactor core 1006 is affected. In addition, fabricating the control element support 1012, and the structures that align the core 1006 with the control elements 1014 is a fabrication that requires tight tolerances and high-quality fabrication in order to ensure safe and predictable reactor operation.

In the illustrated embodiment, the weight of the core is borne by the reactor vessel 1002. The weight of the control elements 1014, on the other hand, is carried by the control element support 1012 that forms a part of the vessel head 1010. In a seismic event that causes movement of the reactor vessel 1002, the motion about the reactor vessel head 1010 will translate to lateral movement of the control elements 1014 about a pivot point located substantially at the vessel head 1010. In contrast, the reactor core 1006 will experience movement associated with the height of the reactor vessel 1002. In other words, the reactor core 1002 will experience movement that is related to the vessel bottom head 1008 that has a magnitude of movement proportional to the height of the reactor vessel 1002. In many cases, a seismic event will tend to cause a greater degree of lateral movement of the core 1006, which is supported by the reactor vessel 1002, in comparison to the movement of the control elements 1014. The differential movement of the core and control elements 1014 can cause swings in reactivity that may be undesirable and unpredictable.

Figure 11:
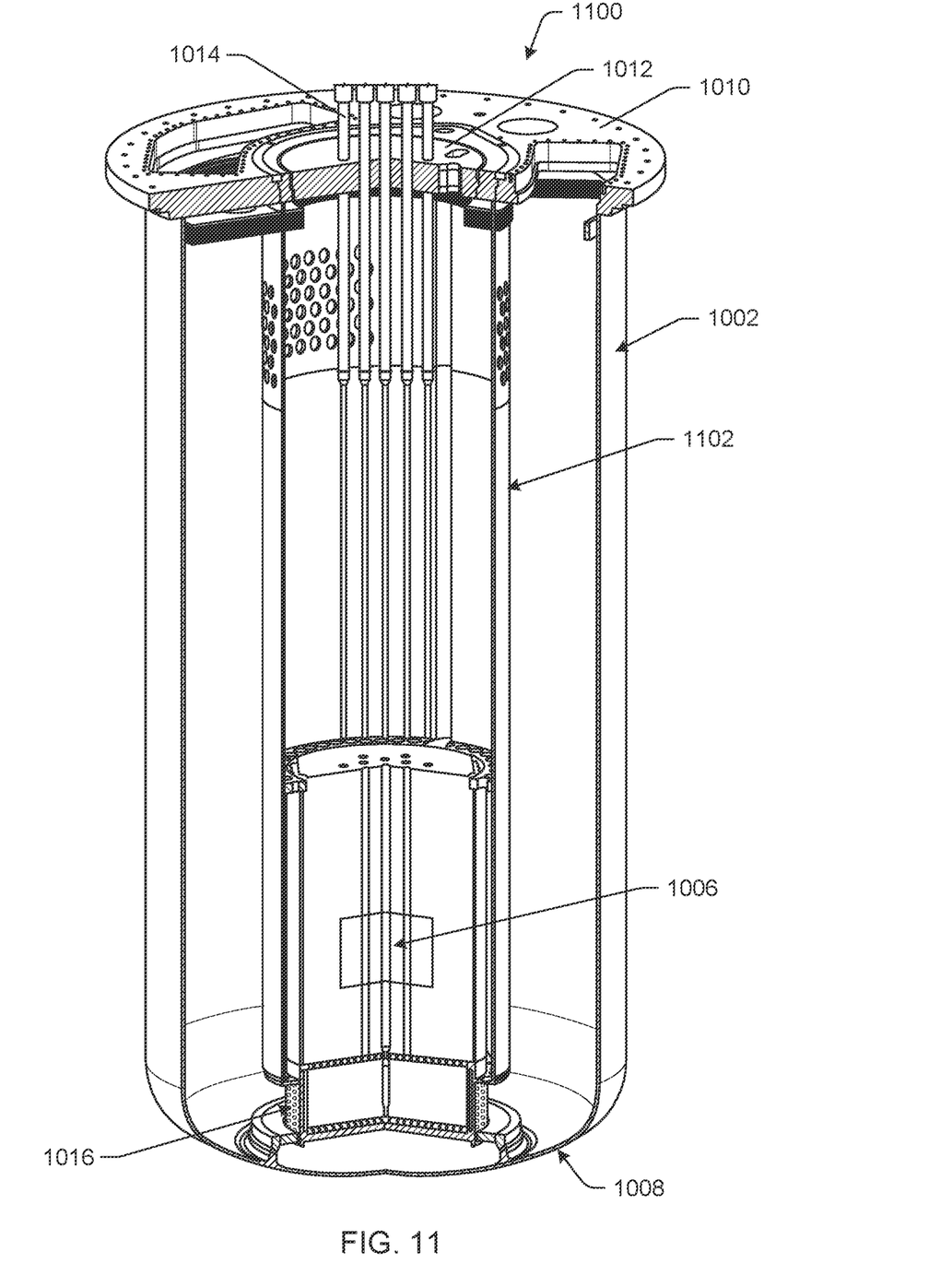
FIG. 11 illustrates a cartridge core support structure that supports the core independently of the reactor vessel, in accordance with some embodiments.

FIG. 11 illustrates a schematic diagram of a nuclear reactor 1100 including a reactor vessel 1002, a core cartridge 1102, and a reactor core 1006. The reactor vessel 1002 further includes a vessel bottom head 1008, and a vessel head 1010. The vessel head 1010 includes a control element support structure 1012 that carries one or more control elements 1014. The control element support structure 1012 is coupled to the core cartridge 1102 so that the core cartridge 1102 hangs from the control element support structure 1012. Thus, the load path for both the reactor core 1006 and control elements 1014 are coupled together by sharing a common support structure 1012 that supports both the control elements 1014 and the reactor core 1006. The result is a significant reduction in differential movement between the control elements 1014 and the reactor core 1006, such as in response to a seismic event.

Moreover, the illustrated configuration provides a cartridge 1102 that can be fabricated in a factory, shipped to the construction site, and lowered into the reactor vessel, even after the reactor vessel 1002 has been installed within the reactor building. In some cases, the cartridge 1102 can be manufactured in a factory to include the reactor core 1006 and the core internals prior to shipping. This improves accuracy in the fabrication of delicate components, reduces the amount of on-site fabrication work, and greatly reduces the time required to install the components on site.

In addition, the illustrated embodiment reduces complexity and removes reliance on the reactor vessel 1002 wall to support the reactor core 1006. As described herein, a first cartridge 1102 may be removed from the reactor vessel 1002 and replaced with a second cartridge 1102, which in some embodiments, has a different configuration from the first cartridge.

Figure 12:
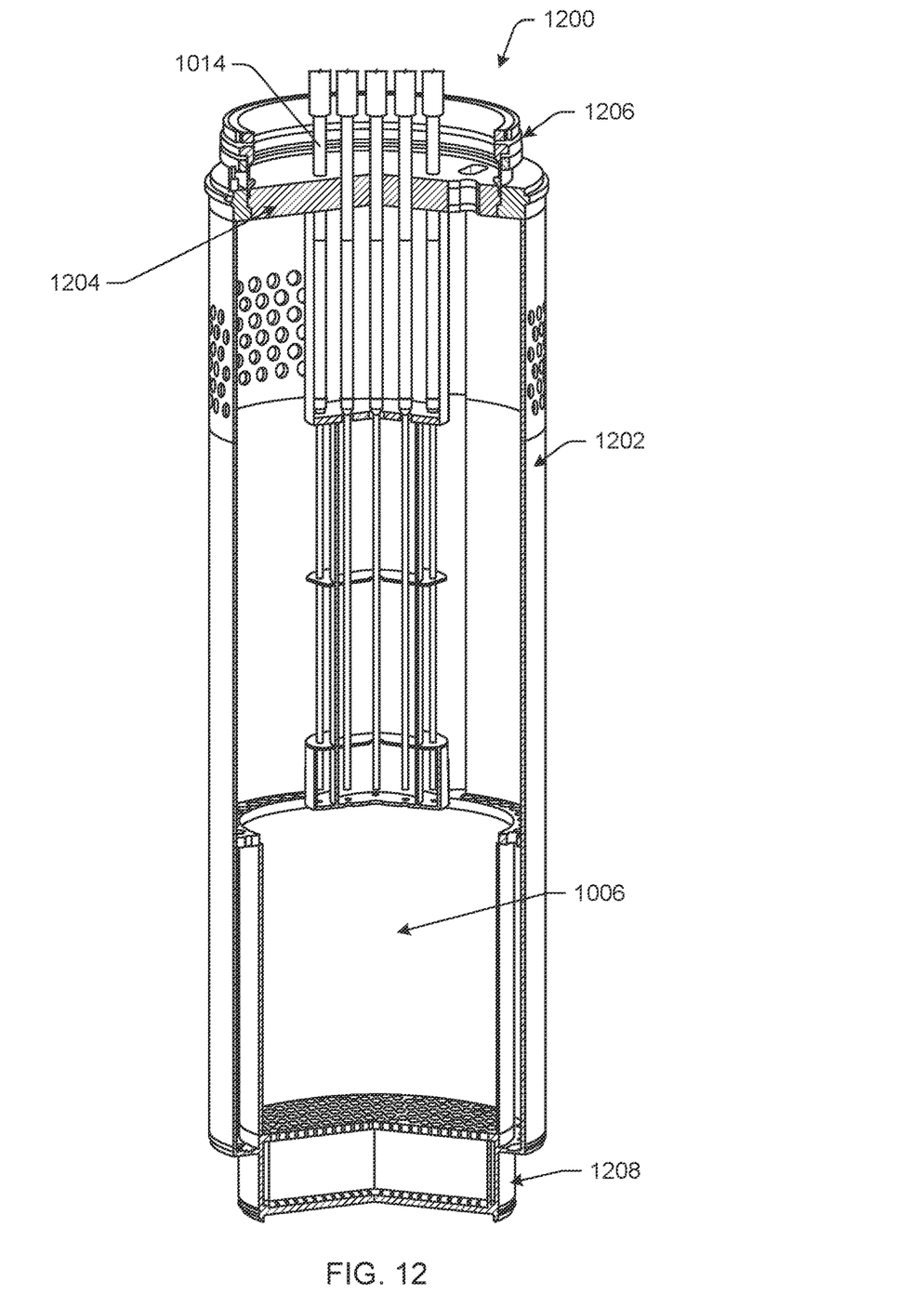
FIG. 12 illustrates a cartridge module, in accordance with some embodiments.

FIG. 12 illustrates a cartridge core barrel 1200 including a generally cylindrical cartridge 1202, a reactor core 1006, and a control element support 1204. The control element support 1204 may include a plurality of apertures for allowing control elements 1014 to be selectively inserted and withdrawn from the core 1006. The cartridge core barrel 1200 includes mounting structures 1206 which may include one or more flanges configured to engage with cooperating structures on a reactor vessel head, thus hanging the cartridge core barrel 1200 from the reactor head. The cartridge core barrel 1200 may further include below core support 1208 that may be configured to cooperating with mating structure on the reactor vessel bottom head to provide further support to the cartridge core barrel 1200.

In some embodiments, the cartridge core barrel 1200 can be fabricated in a manufacturing facility and shipped to the construction site as a module. The reactor core barrel 1200 may be fabricated to include the reactor core 1006, any core internals, control element drive system, and the control element support 1204. The load path of the control elements 1014 and the reactor core 1006 is coupled together so that motion associated with the reactor vessel head transmits motion to both the reactor core 1006 and the control elements 1014 with the same direction and magnitude. This allows the control elements 1014 to remain aligned with the reactor core 1006 to a level never before achieved in reactors in which the load path of the reactor core and the control elements are not coupled together through a common load path.

In addition, the cartridge core barrel 1200 can be manufactured as a module and installed within the reactor vessel after the reactor vessel has been installed within the reactor building, which improves the efficiency in assembly, reduces on-site fabrication, and increases tolerances by virtue of fabricating and assembling the modules within a manufacturing facility. According to some embodiments, the cartridge core barrel 1200 can be fabricated as a module to include the reactor core, rotating plugs, and the control elements support structure. This module can be manufactured within a factory to have tight tolerances that are very difficult to achieve with on-site fabrication techniques and the module with its internal components already installed, can then be shipped to the construction site for installation.

In some embodiments, the cartridge core barrel 1200 is a single module and the reactor vessel may be a separate module. In some cases, the reactor vessel can be sliced into segments along its longitudinal axis to aid in transport and assembly. For example, the reactor vessel can be segmented into cylindrical segments having a suitable length, such as 8 feet, 10 feet, 12 feet, or 15 feet or more to aid in transporting the reactor vessel to the construction site. The segments can be joined together on site and may be joined together in place within the reactor building, such as by placing and installing a first segment in place within the reactor building, then attaching a second segment to the first segment, and so on. Once the reactor vessel is assembled and installed within the reactor building, the cartridge core barrel 1200 can be lowered into the reactor vessel and located within the reactor vessel by aid of the below core supports 1208. The support structure for locating the control elements relative to the reactor core requires a high-precision fabrication process, which is much easier to be met by providing a cartridge core barrel 1200 that is fabricated in a manufacturing plant and shipped to the construction site, and in some cases, includes the reactor core and other internal components pre-assembled prior to shipping. This greatly simplifies construction, increases precision, and does not rely on the reactor vessel to support the weight of the reactor core. By removing the reactor vessel from the reactor core load path, the reactor vessel can be fabricated to be less robust with looser tolerances, which translates to a reduction in time and cost to fabricate the reactor vessel. In other words, the reactor vessel is decoupled from the cartridge core barrel 1200 and the reactor core 1006, and in some cases, there is no reactor vessel participation in support of the reactor core. However, in some embodiments, the reactor vessel may include one or more spacers in the annulus between the reactor vessel and the cartridge reactor core barrel to provide lateral stability in a radial direction.

The cartridge core barrel 1200 may incorporate any suitable below core supports 1208, such as any of the structures shown and described in relation to FIGS. 2-7. Moreover, the concepts presented herein may be applicable to any reactor type, and are especially suitable for reactors that rely on near-atmospheric pressure conditions.

The disclosure sets forth example embodiments and, as such, is not intended to limit the scope of embodiments of the disclosure and the appended claims in any way. Embodiments have been described above with the aid of functional building blocks illustrating the implementation of specified components, functions, and relationships thereof. The boundaries of these functional building blocks have been arbitrarily defined herein for the convenience of the description. Alternate boundaries can be defined to the extent that the specified functions and relationships thereof are appropriately performed.

The foregoing description of specific embodiments will so fully reveal the general nature of embodiments of the disclosure that others can, by applying knowledge of those of ordinary skill in the art, readily modify and/or adapt for various applications such specific embodiments, without undue experimentation, without departing from the general concept of embodiments of the disclosure. Therefore, such adaptation and modifications are intended to be within the meaning and range of equivalents of the disclosed embodiments, based on the teaching and guidance presented herein. The phraseology or terminology herein is for the purpose of description and not of limitation, such that the terminology or phraseology of the specification is to be interpreted by persons of ordinary skill in the relevant art in light of the teachings and guidance presented herein.

The breadth and scope of embodiments of the disclosure should not be limited by any of the above-described example embodiments, but should be defined only in accordance with the following claims and their equivalents.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The specification and drawings disclose examples of systems, apparatus, devices, and techniques that may allow modules of a nuclear reactor to be fabricated in a manufacturing facility and shipped to a construction site, where the modules can be assembled, thereby greatly reducing on-site fabrication complexity and cost. Further, the systems of the nuclear reactor have been simplified and further promote factory fabrication in lieu of on-site fabrication.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

It is, of course, not possible to describe every conceivable combination of elements and/or methods for purposes of describing the various features of the disclosure, but those of ordinary skill in the art recognize that many further combinations and permutations of the disclosed features are possible. Accordingly, various modifications may be made to the disclosure without departing from the scope or spirit thereof. Further, other embodiments of the disclosure may be apparent from consideration of the specification and annexed drawings, and practice of disclosed embodiments as presented herein. Examples put forward in the specification and annexed drawings should be considered, in all respects, as illustrative and not restrictive. Although specific terms are employed herein, they are used in a generic and descriptive sense only, and not used for purposes of limitation.

Unless otherwise noted, the terms "connected to" and "coupled to" (and their derivatives), as used in the specification, are to be construed as permitting both direct and indirect (i.e., via other elements or components) connection. In addition, the terms "a" or "an," as used in the specification, are to be construed as meaning "at least one of." Finally, for ease of use, the terms "including" and "having" (and their derivatives), as used in the specification, are interchangeable with and have the same meaning as the word "comprising."

From the foregoing, and the accompanying drawings, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a particular configuration, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A nuclear reactor core support system, comprising:
a reactor vessel head having a first aperture;
a control element support structure mounted to the reactor vessel head at the first aperture,
wherein the control element support structure is configured to support control elements;
a support cylinder, the support cylinder
having an upper portion and a lower portion
and configured to carry a reactor core therein,
wherein the upper portion is mounted to the control element support structure,
wherein the support cylinder is supported by the control element support structure; and
wherein the support cylinder is configured to hang from the control element support structure within a reactor vessel having control elements,
whereby the control element support structure supports weight of each of the control elements, the support cylinder, and the reactor core.

2. The nuclear reactor core support system as in claim 1, wherein the support cylinder is configured to be preassembled and shipped with the reactor core therein.

3. The nuclear reactor core support system as in claim 1, further comprising a control element support system configured to insert and withdraw control elements from the core, the control element support system mounted to the support cylinder.

4. The nuclear reactor core support system as in claim 1, wherein a reactor core is located within the support cylinder and the entire weight of the reactor core is supported by the reactor vessel head through the support cylinder.

* * * * *